May 7, 1963 R. L. McILVAINE ETAL 3,088,183
APPARATUS FOR TREATING GRANULAR MATERIAL
Original Filed Aug. 30, 1957 2 Sheets-Sheet 1

INVENTORS
ROBERT L. McILVAINE
and RALPH J. DONAT by Mason, Kolehmainen, Rathburn and Wyss
ATTORNEYS.

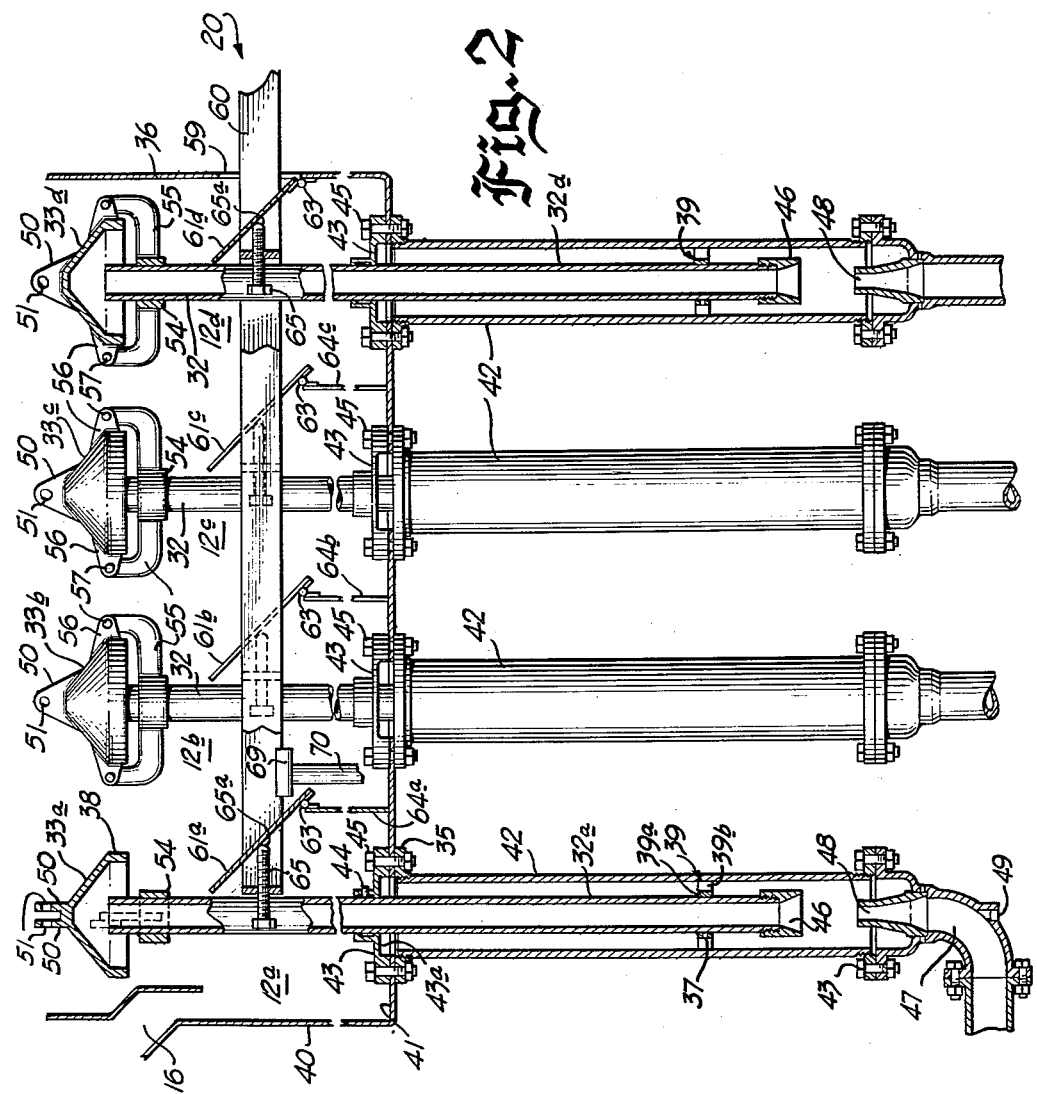
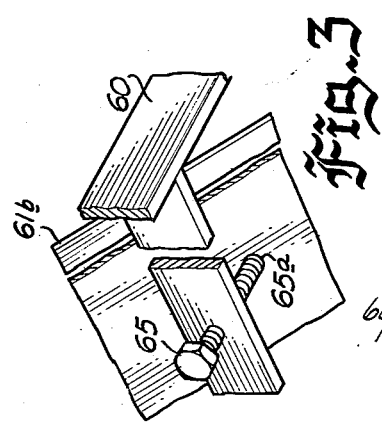

United States Patent Office 3,088,183
Patented May 7, 1963

3,088,183
APPARATUS FOR TREATING GRANULAR MATERIAL
Robert L. McIlvaine, Winnetka, and Ralph J. Donat, Chicago, Ill., assignors to Herbert Simpson Corporation, Chicago, Ill., a corporation of Illinois
Continuation of application Ser. No. 681,272, Aug. 30, 1957. This application Dec. 19, 1960, Ser. No. 76,976
1 Claim. (Cl. 22—89)

The present invention relates to a method and apparatus for treating granular material and particularly to a method and apparatus for reclaiming granular materials used in conventional foundry operations. Specifically, the present invention is an improvement of the invention disclosed and claimed in United States Patent No. 2,813,318 of Walter Horth, issued November 19, 1957, and assigned to the same assignee as the present invention. This application is a continuation of the copending application, Serial No. 681,272, filed August 30, 1957, and assigned to the same assignee as the present copending application.

In conventional foundry practice, granular base materials, such as silica sand, zirconia sand and the like, are coated with binder products, for example, clays, cereals, resins, and oils, so that the resulting mixture can be molded into definite shapes corresponding to the contours of the castings to be made. These coatings are calcined or oxidized when coming into contact with molten metals and, as a result, the base materials can only be re-used or reclaimed by removing the coatings or at least the spent portions thereof.

In the method and apparatus described in the above-identified application, the removal of both carbonaceous as well as non-carbonaceous coatings from the granular materials has been effected by the use of a so-called dry process employing a gas stream which functions as the sole conveying, scrubbing, and coating removal medium, the structure for obtaining this desirable result being the first commercially successful dry reclamation unit. This structure includes a plurality of separate treating stages within each of which the granular material is entrained in a gas stream and is projected against a target so that the coatings are separated from the base granular material by impact or friction and the dislodged coatings, in the form of fines, are carried off by the gas stream. The granular material is then either recycled through the same treating stage or is discharged into a succeeding stage. In the construction shown in the prior application, the granular material passes from treating stage to treating stage through overflow ports and the rate of flow through the stages and, hence, the quality of the reclaimed granular material, i.e., the amount of coating remaining on the base material after passage through all of the stages is adjusted by controlling the rate of introduction of the sand into the first stage of the apparatus. However, to obtain quality and quantity control by adjusting either the rate of delivery of sand to the inlet or the rate of discharge of sand from the outlet is not altogether satisfactory in all installations since the control effected is sluggish due to the fact that some time is required for the sand flow through each stage to adjust itself to the change in total flow through the apparatus. In any event, by recycling the sand through the stages a selected number of times all or selected amounts of the coatings or binder products can be removed to permit subsequent use of the reclaimed material. By leaving a usable portion of the coatings on the base material, the amount of new binder products and the like which must be added in order to render the granular material useful for further molding operations is substantially reduced.

It would be desirable to provide a method and apparatus for reclaiming granular material wherein the rate of flow of the granular material through the apparatus and thus the quality of the reclaimed material is positively controlled and, accordingly, it is one of the principal objects of the present invention to provide a method and apparatus for achieving this desired result.

It is another object of the present invention to provide an accurate quality control for granular material passing through a reclamation apparatus.

A further object of the present invention is to provide a new and improved method and apparatus for reclaiming granular foundry material in which the recycling of granular material in each treating stage is individually controlled depending upon the amount of the bonding coating to be removed from the granular material in each particular stage.

Another object of the present invention is to provide a multiple stage reclamation apparatus embodying an air conveying, scrubbing and coating removal medium in which the rate of discharge of the treated material is adjustable from the exterior of the apparatus.

It is another object of the present invention to provide a multiple stage reclamation apparatus embodying an air conveying, scrubbing and coating removal medium in which the rate of discharge of the treated material from one stage to a succeeding stage is individually adjustable independently of the rate of discharge from other stages and in which the the rates of discharge from all of the stages are adjustable by a common control mechanism.

Still another object of the present invention is to provide a new and improved multiple stage pneumatic reclamation apparatus wherein the velocity of the pneumatic medium for scrubbing granular material is independently adjustable in each stage of the apparatus to provide for optimum scrubbing action without pulverizing or excessive diminution of the granular material.

It is another object of the present invention to provide a new and improved method for reclaiming granular foundry material whereby the material is adapted to be selectively recycled a predetermined number of times in each of the successive stages of the apparatus depending upon the amount of coating of bonding material to be removed at each stage.

It is yet another object of the present invention to provide a new and improved method for reclaiming granular foundry material wherein a quality control is provided for the purpose of producing reclaimed granular foundry material having predetermined characteristics.

The above and other objects are achieved, in accordance with the present invention, by providing a pneumatic reclamation apparatus of the same general type as described in the above-identified application. Briefly, the foundry material is scrubbed or cleaned by passing it in succession through a plurality of stages and in each such stage the material is re-scrubbed or recycled by means of the mechanism of the present invention. This mechanism includes a positive feed control for controlling simultaneously the rates of discharge of the granular foundry material between successive stages in the apparatus and, hence, to control the number of recycling operations in each stage. In order to compensate for the decreased weight of the granular material as its bonding agents or other coatings are removed during passage through the successive stages, discharge means at each stage are individually operated to change the rate of discharge from each stage independently of the rates of discharge from other stages. Moreover, the velocities of the pneumatic media used to scrub the foundry material and remove the bonding agents are individually controlled in each of the stages so that the granular material is not pulverized or diminuted excessively during the scrubbing operation.

Other objects and advantages of the present invention will become apparent from the following description of an illustrative embodiment thereof, in the course of which reference is had to the accompanying drawings wherein:

FIG. 2 is an enlarged, fragmentary, vertical, elevational view partially in section, and illustrating certain details of construction of the apparatus shown in FIG. 1; and FIG. 3 is an enlarged, fragmentary, perspective view showing the details of a new and improved flow control mechanism for effecting the stage-to-stage feeding.

Figure 1:
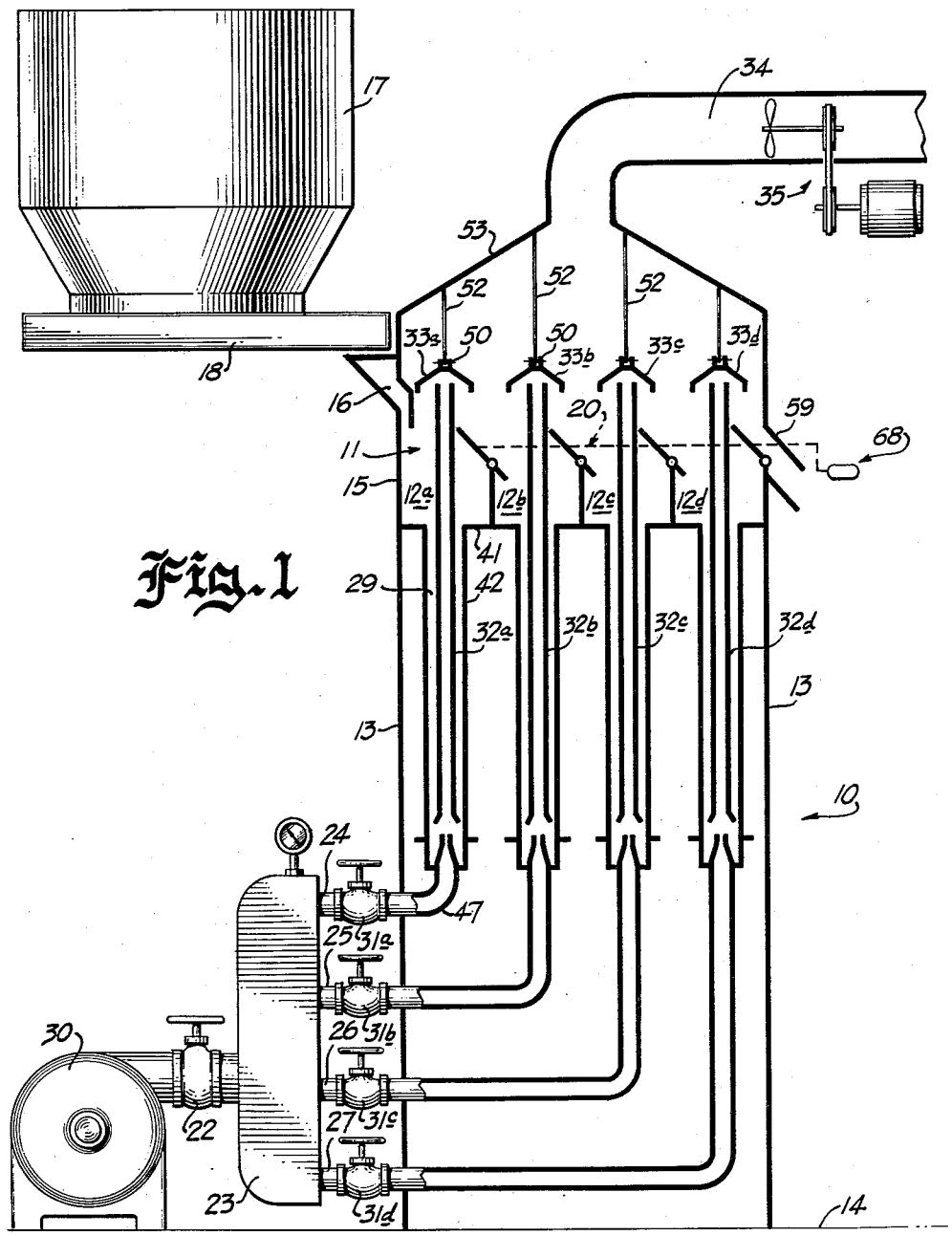
FIG. 1 is a diagrammatic view of a granular material reclamation apparatus characterized by the features of the present invention.

Referring now to the drawings and particularly to FIG. 1 thereof, there is illustrated a granular material reclamation apparatus 10 which is particularly useful in reclaiming granular materials used in foundry molding operations. The granular materials usually employed in these foundry operations include, for example, silica sand, zirconia sand and the like and, for convenience, all such materials are hereinafter referred to as sand. In conventional foundry practice, prior to use in a mold, the sand is coated with bonding agents such as clays, cereals, resins, cements and oils, these agents including both carbonaceous and non-carbonaceous material. The exposure of the coated sand to molten metal causes the sand to calcine or oxidize, thereby forming a residue of spent bonding agents as a coating on the sand particles and, unless either completely or partially removed, each a coating effectively prevents re-use of the sand.

Additionally, the present invention contemplates the treatment of granular materials such as above enumerated to knock off sharp projections and corners of the particles to produce materials composed of more rounded grains. The rounding of the grains is beneficial in affording increased flowability, better packing and higher green strengths.

Further, it is contemplated that granular materials may be treated prior to their use in operations requiring bonding of the materials with liquids and powders. It has been found that such treatment roughens the surfaces of the grains to provide a more favorable surface for adhesion of liquids and solid bodies than the original polished surfaces found in many granular materials prior to use. Such treated materials when used in a molding operation provide higher green strengths and dry tensile properties for given amounts of oil and bonding materials, and thus require less of such materials, with a consequent saving in material costs.

Briefly, the apparatus 10 comprises a housing 11 within which is disposed a plurality of side-by-side sand treating cells or stages, these stages being referred to collectively as 12 and individually as 12a, 12b, 12c and 12d in subsequent portions of the specification. Although four such stages are illustrated, it will be recognized that any desired number can be provided with the number selected for any particular installation depending upon such factors as the size of the foundry, the sand handling capacity and quality desired and other similar conditions. The housing 11 is supported upon a framework 13 so that it is elevated somewhat with respect to the floor 14 of the foundry. All of the treating stages are formed upon a horizontal sand supporting plate or base 41 on the housing 11.

Defined in the side wall 15 of the housing 11 and opening to the cell 12a is an inlet 16 for receiving sand at a uniform and controlled rate from a vibrating feed conveyor 18 which in turn receives inlet sand from a storage bin or hopper 17. Inlet sand may, of course, be supplied to the inlet 16 by other conventional feeding mechanisms such as a screw conveyor or the like. In any event, with the feeding equipment illustrated the sand passes by gravity flow through the inlet 16 and then flows successively through the treating cells 12a, 12b, 12c and 12d in that order under the control of a flow control mechanism 20 characterized by the features of the present invention.

More particularly, the sand enters each of the treating cells 12 adjacent its upper end and moves downwardly by gravity to be entrained in a high velocity air stream produced by a blower 30, the velocity of the gas stream in each of the treating cells 12 being controlled by a throttle valve. The throttle valves are referred to hereinafter collectively by the reference numeral 31 and are individually identified by reference numerals 31a, 31b, 31c and 31d. The air stream at the outlet of the blower 30 passes through a main control valve 22 to a distributing manifold 23 which is provided with a series of outlet pipes or lines 24, 25, 26 and 27. The valve 31a is interposed in the line 24 to control the pressure and, hence, the velocity of the gas stream supplied to the stage 12a while valves 31b, 31c and 31d are respectively inserted in lines 25, 26 and 27 to control the velocities of the air streams in the stages 12b, 12c and 12d, respectively. While the valves 31a, 31b, 31c and 31d are illustrated as comprising adjustable pressure dropping valves, they may also comprise fixed orifice plates for effecting predetermined pressure drops in the air streams passing therethrough.

In each treating cell the air stream carries the entrained sand upwardly through a vertical conduit or tube which directs the combined air stream and sand against an inverted, somewhat conically shaped target. The vertical conduits in the stages 12a, 12b, 12c and 13d are designated 32a, 32b, 32c and 32d, respectively, and are generally referred to hereinafter by reference numeral 32 while the corresponding targets are designated as 33a, 33b, 33c and 33d and are generally referred to as 33. At the target at least a portion of the bonding agents or coatings are removed from the sand and are carried away as fines in the air stream which is exhausted from the housing 11 through a gas outlet conduit 34 with the assistance of suitable suction apparatus 35. A portion of the sand passing downwardly from the target 33a, is deflected by the flow control mechanism 20 into cell 12b, while a portion of the sand from target 33b is deflected into cell 12c and a portion of the sand from target 33c is deflected into cell 12d. After treatment in all of the cells in the manner described above, the sand is deflected from target 33d through an outlet opening or passage 59 where it is collected for distribution directly to a molding station or to a storage area where it is available for future use.

For a better understanding of the scrubbing action effected in each stage reference may be had to the above-identified Horth Patent No. 2,813,318. Since the treating stages of the apparatus of the present invention are identical to one another and are similar to the treating cells described in the Horth application, only one of these treating stages, namely the stage 12a, will be described in detail.

Referring now to FIG. 2, the treating stage 12a is disposed adjacent the side wall 15 of the housing 11 and includes a generally cylindrical casing or shell 42 which extends downwardly from the supporting plate 41. The conduit 32a is partially disposed within the cylindrical casing 42, thereby cooperating with the casing to define an annular passageway 29 for delivering sand from the sand supporting plate 41 to the air stream. The conduit 32a comprises a tube adjustably secured in the casing 42 by means of a bracket 43 and set screw 44, the bracket being secured to the sand supporting plate 41 by means of bolts 45. The latter bolts may be removed to permit replacement or repair of the conduit 32a and its bracket. The bracket 43 includes a plurality of radial ribs 43a defining openings connecting the passageway 29 to the housing 11 in order to permit the flow of sand downwardly through the passageway. The casing 42 is threaded into an internally threaded annular ring 35 which is seated against the underside of the plate 41 and is held in position by the bolts 45. The lower portion of the tube 32a is concentric with the casing 42 and is spaced therefrom by means of a spacer 39 suitably secured to the outside wall of the tube. The spacer 39 comprises a central ring 39a and spaced apart fins 39b extending radially from the ring in order to define openings to permit the flow of sand through the passageway 29. The central ring 39a is suitably secured to the conduit 32a as, for example, by means of set screw 37. The target 33a is located adjacent the upper end of the tube 32a and is so positioned that the upper end of the tube terminates substantially within the confines of a vertical, annular lip 38, thereby to provide a restricted high velocity path for the air stream passing outwardly between the lip 38 and the external surface of the tube 32a, as indicated by the arrow pointed lines.

The target 33a includes upwardly extending lugs or ears 50 having aligned openings 51 therein for accommodating a suspension cable assembly 52 which functions to suspend the target from the roof or top wall 53 of the housing 11. To prevent movement of the target with respect to the upper end of the conduit, the target includes a central hub 54 encircling the upper end of the conduit 32 and having radially extending arms 55 secured by means of bolts 57 to attaching lugs 56 on the target.

An entry piece 46 is threaded onto the lower end of the tube 32a for the purpose of directing the air stream developed by a curved gas inlet fitting 47 into the tube 32a. The fitting 47 is connected at the outlet side of valve 31a and is secured to the lower end of the casing 42 by fasteners 43. The fitting 47 terminates in a nozzle 48 spaced from the lower end of the entry piece 46 by a distance sufficient to permit entrainment of the downwardly moving sand located in the passageway 29 within the upwardly moving air stream emitted from the nozzle. The tube 32a is of sufficient length to allow the sand particles entrained within the air stream to reach the velocity of the air stream by the time they reach the upper end of the tube just prior to impingement against the target 33 and, to effect this result, the tube must be several feet in length.

The construction of the nozzle 48 and the entry piece 46 are such as to provide for proper entrainment of the sand in the air stream. To determine the proper degree of sand entrainment, it should be observed that the scrubbing of the sand can best be accomplished by entraining sufficient sand to produce particle to particle abrasion in the target area in addition to the action produced by the target itself and, to this end, a large volume of sand should be entrained but the volume must not be enough to decrease the velocity of the sand particles in the air stream since effective scrubbing depends upon the sand impinging against the target at the velocity of the air stream. As a matter of fact, it has been found that the scrubbing operation is accomplished by forming a pocket of sand at the apex of the conical target which pocket is held in suspension by the force of the air stream and is contacted by the sand particles entrained in the air stream when these particles emerge into the target area. In addition, it is desirable that the amount of sand falling upon the supporting plate 41 from the target 33a be sufficient to provide a sand mass for receiving the particles deflected from the target, thereby preventing undue and unnecessary erosion of the structural elements which would, in the absence of this sand mass, be exposed to the sand particles. When the apparatus 10 is not in operation, material in the cylindrical casing 42 and, specifically, sand in the passageway 29, tends to flow within the air inlet fitting 47, thereby to provide an obstacle for the air stream when the apparatus is started. The pressure of the gas stream from the blower 30 is generally inadequate to displace the sand located within the air inlet fitting and, to effect such displacement, a secondary air jet may be introduced through a port 49 to supplement the pressure of the main air stream passing through the fitting 47.

As indicated above, the sand is deflected from the target 33a toward the sand supporting plate 41 thereby combining with the sand flowing through the inlet 16 to build up a sand mass which protects the surface of the plate 41 and other parts within the housing 11.

In accordance with an important feature of the present invention there is provided an improved flow control mechanism 20 for positively controlling the amount of sand flowing from stage to stage and for also controlling the sand flow within each stage. The mechanism 20 comprises a plurality of deflector plates 61a, 61b, and 61c respectively supported upon vertical partitions 64a, 64b and 64c and a deflector plate 61d supported upon side wall 36 of the housing 11. The partitions 64a, 64b and 64c are mounted upon the horizontal supporting plate 41 and separate the treating stages within the housing. Thus, partition 64a extends between the treating cells 12a and 12b, partition 64b extends between the treating cells 12b and 12c and partition 64c extends between the treating cells 12c and 12d. Each deflector plate is supported for pivotal movement about a hinge 63. The deflector plates 61a, 61b, 61c and 61d are so located with respect to their associated targets that a portion of the sand deflected from each target is intercepted and guided into the succeeding or adjacent treating cell, the balance of the deflected sand being returned to the sand mass on the plate 41 for recycling through the same treating cell. A pair of parallel control bars 60 extending through the housing 11 and emerging from the outlet opening 59 are used in order to alter the positions of all of the deflector plates in unison. Specifically, horizontal movement of the control bars 60 causes the deflector plates 61a, 61b, 61c and 61d to pivot about their hinges thus changing their angular positions below their associated targets with the result that the rate of discharge of the treated sand from each treating cell to the next succeeding treating cell is altered. By this construction, the number of recycling operations of the sand within each treating cell may be varied to obtain quality control since, if only a small portion of the treated sand is intercepted by the deflector plates and passed to the next cell, that is, if the plates are pivoted in a clockwise direction as viewed in FIG. 2, substantially all of the treated sand is returned to the sand mass for recycling, thereby effecting more complete removal of the coating. If, on the other hand, the deflector plates are positioned to deflect nearly all of the sand to the succeeding cells, that is, if the plates are pivoted in a counterclockwise direction as viewed in FIG. 2, very little of the sand is recycled and a lesser portion of the coating is removed, although the rate of flow through the stages is increased.

It is frequently desirable to remove substantially all of the bonding agents and other coatings from the sand in the first few treating cells and, under these conditions, the weight of the particles is considerably lessened. Accordingly, it is not necessary that the sand be recycled through the last few treating cells as many times as it is recycled in the first few stages. Therefore, in accordance with another aspect of the present invention, the deflector plates are individually adjustable relative to the control bars 60 so that more of the sand may be intercepted in the final treating stages to prevent unnecessary recycling of the sand after it has been substantially cleaned.

Considering now the manner in which this individual adjustment is made, only the deflector plate 61a and its associated structure will be described in detail, since the deflector plates 61b, 61c and 61d and their associated structures are similar. The deflector plate 61a comprises a flat metallic plate made from material having a high resistance to the abrasive action of the high velocity sand particles. As previously mentioned, the plate 61a is pivotally attached at its lower end to a hinge 63 located at the upper edge of the partition 64 disposed upon the horizontal supporting plate 41 between the cells 12a and 12b. The deflector plate 61a is adapted to be moved about its hinge 63 to different angular positions below the target 33a independently of the movement of the other deflector plates by means of an adjustable screw 65 threadedly secured to a bracket or support arm which is welded or otherwise secured to the bars 60. The plate 61a is seated by gravity against the tip or end 65a of the adjustable screw 65 and, as a result, the screw may be turned in a direction to move its tip 65a toward the right as viewed in FIG. 2, thereby pivoting the plate 61a in a clockwise direction and deflecting less of the sand to the cell 12b, or, alternatively, the screw 65 may be selectively turned to move its tip to the left, thus allowing the plate 61a to pivot in a counterclockwise direction to deflect more sand from the target to the cell 12b.

Suitable locking nuts (not shown) may be used to hold the screw 65 in position on the bracket 66 after the screw has been adjusted. Rotation of deflector plates in a clockwise direction as viewed in FIG. 2 is limited by the sections of the hinge 63 which effectively prevent the deflector plates from moving beyond a vertical position. Rotation of the deflector plates in a counterclockwise direction is limited by the arms or brackets 66 in the event that the adjusting screw is moved toward the left and beyond the limiting position.

As previously indicated, the remaining deflector plates 61b, 61c and 61d are also individually adjustable relative to the control bars 60 so that they can be pivoted about their hinge pins to different angular positions. Moreover, while the deflector plates 61a, 61b, 61c and 61d are independently pivotable by means of the adjusting screws 65 all of these deflector plates may be simultaneously pivoted by horizontal movement of the common control bars 60 as described above.

In installations where a single control bar is sufficient to support the sand load falling upon the deflector plates, one of the bars 60 can be eliminated. In any event the framework or, more specifically, the bars 60 are supported and moved by a suitable manually operable mechanism 68, shown only in FIG. 1, which is capable of moving the bars 60 horizontally along guide rails 69 supported upon structure 70 secured either to the plate 41 or to the walls of the housing 11. As indicated above, movement of the control bars 60 horizontally to the left as viewed in FIG. 2 causes the deflector plates 61a, 61b, 61c and 61d to be pivoted simultaneously in a counterclockwise direction in order to intercept an increased quantity of the sand deflected from the targets 33. Conversely, when the control bars 60 are moved to the right, the deflector plates 61a, 61b, 61c and 61d intercept a smaller amount of sand, thereby causing more of the sand deflected from the targets to be recycled through the treating cells. In this manner, an effective, accurate control of the quality of the sand emanating from the discharge opening 59 is obtained since a positive and controlled sand flow is provided between successive stages for the purpose of controlling the degree of recycling of the sand during a predetermined time period.

In operation, it has been found advisable to position the plate 61a so that only a relatively small amount of sand is discharged from treating cell 12a to the cell 12b, whereby the sand within the cell 12a is recycled a large number of times to remove a considerable amount of the bonding agents coated on the sand prior to passage of the sand into the succeeding treating cells 12b, 12c and 12d. Since the sand becomes progressively cleaner in treating cells 12b, 12c and 12d it need be recycled a fewer number of times in each successive stage and, accordingly, the deflector plates 61b, 61c and 61d are so positioned that progressively greater portions of the sand deflected from the targets are passed to the succeeding treating stages.

In accordance with another aspect of the present invention, the velocities of the air streams flowing in the treating cells are respectively controlled by the throttle valves 31a, 31b, 31c and 31d. When the deflector plates 61a, 61b, 61c and 61d are differently arranged relative to the bars 60 in the manner indicated above, it is important that the lighter weight sand in the final treating stages does not impinge against the respective targets with the same velocity that the sand impinges against the target 33a in the first treating cell 12a. In order to prevent the lightweight sand from being pulverized or over-cleansed in the final treating cells, the throttle control valves are adjusted to reduce the air stream velocities in these particular cells. Thus, in the first treating cell 12a where the sand is heavily coated with a bonding agent, the velocity of the air stream is relatively high, whereas in the final treating cells 12c and 12d where the sand is comparatively clean and there is little cushioning effect from the bonding agent, the air stream velocities are progressively reduced with the result that pulverizing or excessive diminution of the sand particles is avoided.

The flow control mechanism of the present invention effects a stage-to-stage sand flow while permitting the stages to be located at the same elevation. In this manner, the overhead space required for the installation is minimized, a factor which is extremely important in small foundries where the available overhead is limited. Moreover, if desired, the successive treating cells could be progressively elevated somewhat by using the deflectors in the flow control mechanism of the present invention to effect interstage feeding.

While the present invention has been described in connection with an illustrative embodiment thereof, it should be understood that many modifications will be apparent to those skilled in the art and it is therefore intended in the appended claims to cover all such modifications falling within the true spirit and scope of the invention.

What is claimed as new and is desired to be secured by Letters Patent of the United States is:

A granular material treating apparatus comprising a plurality of target means, a plurality of side-by-side treating cells in each of which granular material is entrained within a gas stream directed against one of said target means for removing portions of the outer surface of the granular material so that the remainder of the granular material after removal of the surface portions is deflected by the target means toward a collecting point for recycling through the gas stream, a plurality of adjustable directing members respectively disposed between each target means and its associated collecting point for intercepting a portion of the material deflected by each target and feeding it to the succeeding stage in order to effect stage-to-stage flow of the granular material, means for individually and independently adjusting each directing member in order to vary the amount of material intercepted in each stage, thereby to control the recycling, and means for adjusting the position of all of the directing members in unison in order to vary the rate of flow of granular material through the stages.

References Cited in the file of this patent

UNITED STATES PATENTS

| | | |
|---|---|---|
| 1,959,465 | Dryfoos | May 22, 1934 |
| 2,223,018 | Christensen | Nov. 26, 1940 |
| 2,813,318 | Horth | Nov. 19, 1957 |
| 2,861,304 | Wenninger | Nov. 25, 1958 |
| 2,939,189 | Wenninger | June 7, 1960 |

FOREIGN PATENTS

| | | |
|---|---|---|
| 433,034 | Great Britain | Aug. 7, 1935 |